(12) United States Patent  
Rajan et al.

(10) Patent No.: US 7,747,660 B1  
(45) Date of Patent: Jun. 29, 2010

(54) METHOD AND SYSTEM OF PROVIDING ACCESS TO A VIRTUAL STORAGE DEVICE

(75) Inventors: Basant Rajan, Pune (IN); Milind Borate, Pune (IN); Ganesh Varadarajan, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 945 days.

(21) Appl. No.: 10/395,415

(22) Filed: Mar. 24, 2003

(51) Int. Cl.
*G06F 7/00* (2006.01)

(52) U.S. Cl. .............................. 707/821; 707/831; 711/6
(58) Field of Classification Search ................. 707/205, 707/1, 2, 3, 4, 5, 104.1, 100, 10; 711/3, 6
See application file for complete search history.

(56) References Cited

U.S. PATENT DOCUMENTS

| | | | |
|---|---|---|---|
| 5,134,696 A * | 7/1992 | Brown et al. ..................... 711/3 |
| 5,144,692 A * | 9/1992 | Baker et al. .................. 710/240 |
| 5,355,477 A * | 10/1994 | Strickland et al. .............. 707/8 |
| 5,363,497 A * | 11/1994 | Baker et al. .................. 711/153 |
| 5,388,215 A * | 2/1995 | Baker et al. .................. 709/229 |
| 5,539,899 A * | 7/1996 | Huynh et al. ................. 711/171 |
| 5,542,065 A * | 7/1996 | Burkes et al. ................ 711/114 |
| 5,553,286 A * | 9/1996 | Lee ............................. 717/162 |
| 5,752,005 A * | 5/1998 | Jones ............................ 703/22 |
| 5,953,522 A * | 9/1999 | Fox et al. ..................... 719/321 |
| 6,105,103 A * | 8/2000 | Courtright et al. .............. 711/1 |
| 6,185,580 B1 * | 2/2001 | Day et al. ..................... 707/205 |
| 6,237,008 B1 * | 5/2001 | Beal et al. .................... 707/204 |
| 6,272,611 B1 * | 8/2001 | Wu ............................. 711/173 |
| 6,289,357 B1 * | 9/2001 | Parker ........................ 707/202 |
| 6,438,642 B1 * | 8/2002 | Shaath ....................... 711/100 |
| 6,493,811 B1 * | 12/2002 | Blades et al. ............... 711/203 |
| 6,538,669 B1 * | 3/2003 | Lagueux et al. ............ 715/764 |
| 6,553,408 B1 * | 4/2003 | Merrell et al. .............. 709/213 |
| 6,569,704 B1 * | 5/2003 | Takeuchi et al. .............. 438/94 |
| 6,618,794 B1 * | 9/2003 | Sicola et al. ................ 711/154 |
| 6,760,815 B1 * | 7/2004 | Traversat et al. ............ 711/135 |
| 6,763,440 B1 * | 7/2004 | Traversat et al. ............ 711/159 |
| 6,865,657 B1 * | 3/2005 | Traversat et al. ............ 711/170 |
| 6,973,549 B1 * | 12/2005 | Testardi ...................... 711/150 |
| 7,024,427 B2 * | 4/2006 | Bobbitt et al. .............. 707/200 |
| 7,389,312 B2 * | 6/2008 | Ohran ......................... 707/204 |
| 2002/0112113 A1 * | 8/2002 | Karpoff et al. ................. 711/4 |
| 2002/0161983 A1 * | 10/2002 | Milos et al. ................. 711/202 |
| 2002/0169932 A1 * | 11/2002 | Burns et al. ................. 711/154 |
| 2003/0033497 A1 * | 2/2003 | Blades et al. ............... 711/202 |
| 2003/0110188 A1 * | 6/2003 | Howard et al. .............. 707/200 |
| 2003/0172221 A1 * | 9/2003 | McNeil ....................... 710/305 |

\* cited by examiner

*Primary Examiner*—Hosain T Alam
*Assistant Examiner*—Leon Harper
(74) *Attorney, Agent, or Firm*—Campbell Stephenson LLP

(57) ABSTRACT

A method and system of providing access to a virtual storage device is disclosed. According to one embodiment, access is provided to a virtual storage device comprising a file system storage object to store data to be written to the virtual storage device and a storage device. According to another embodiment, the virtual storage device further comprises a file system storage object to represent the virtual storage device.

21 Claims, 10 Drawing Sheets

METHOD AND SYSTEM OF PROVIDING ACCESS TO A VIRTUAL STORAGE DEVICE

BACKGROUND

1. Technical Field

The present invention relates to data storage and retrieval generally and more particularly to a method and system of providing access to a virtual storage device.

2. Description of the Related Art

Information drives business. For businesses that increasingly depend on data and information for their day-to-day operations, unplanned downtime due to data loss or data corruption can damage their reputations and bottom lines. Data can be corrupted or lost due to hardware and/or software failure, user error, and/or intentional malicious action. To increase data consistency and integrity and minimize the impact of data corruption, a number of techniques have been developed and implemented. One such technique involves the generation of backup or "snapshot" data which may be utilized in the event corruption of "primary" or "production" data occurs.

Such a snapshot is typically generated by first mirroring data from a primary data storage area to a backup, or "mirror" storage area in real time as updates are made to the primary data. Periodic "snapshots" of data may then be generated by "detaching" a mirror being updated in real time so that it is no longer updated. Detaching the mirror involves halting transactions being applied to the primary data storage area and to the mirror for a very brief time period to allow existing transactions to complete. A snapshot is then taken which serves as a frozen or "point-in-time" image, and provides a logically consistent copy of, the primary data. Such snapshot data may be useful in performing backups, data analysis, etc., and to recover from unintentional or unforeseen data corruption (e.g., where snapshot data is created on a regular or periodic basis) as well as to perform "provisional" write operations or updates, further described herein, to avoid data corruption resulting from anticipated or intentional data changes (e.g., where snapshot data is created on-demand prior to an update).

FIGS. 1A and 1B illustrate the generation of a snapshot within a data storage system according to the prior art. In FIG. 1A, two mirrors of data 110 are maintained within a storage environment 100, and corresponding updates are made to mirrors 120A and 120B when an update, such as update 104A, is made to data 110. For example, update 104B is made to mirror 120A residing on mirror data storage area 122, and corresponding update 104C is made to mirror 120B residing on mirror data storage area 124 when update 104A is made to data 110. In a conventional data storage system, each mirror may reside on a separate physical storage device from the data for which the mirror serves as a backup, and therefore, data storage areas 112, 122, and 124 correspond to three physical storage devices in the illustrated example.

A snapshot of data can then be made by "detaching," or "splitting," a mirror of the data so that the mirror is no longer being updated. FIG. 1B shows storage environment 100 after detaching mirror 120B. Detached mirror (snapshot) 120B serves as a snapshot of data 110 as it appeared at the point in time that mirror 120B was detached. When another update 106A is made to data 110, a corresponding update 106B is made to mirror 120A. However, no update is made to detached mirror (snapshot) 120B. Instead, a pointer to the data changed in update 106A is retained in a data change log 130 which tracks changes in primary data with respect to detached mirror (snapshot) 120B.

In a typical data storage system resynchronization allows snapshots to be refreshed and re-used rather than discarded. A snapshot such as snapshot 120B can be quickly re-associated with the primary data which it previously mirrored in a process sometimes referred to as a "snapback." Updates made to the primary volume while the snapshot was unavailable for update are tracked using data change log 130. When the snapshot is "re-attached" to again serve as a mirror, only the updates that were missed are applied to re-synchronize the snapshot with the primary data. For example, if the storage device storing detached mirror (snapshot) 120B will be again used to serve as a mirror for production data, an update applying the change made in update 106A would be applied to snapshot 120B before other updates are made.

According to one known process, a provisional write operation or update is performed on a snapshot in order to avoid the corruption and/or loss of primary data. A snapshot is first generated as described herein and a desired operation is performed on the snapshot. The result of performing the operation on the snapshot may then be analyzed to determine the effect the operation would have had on the primary data. Thereafter, the snapshot may be accessed, resynchronized or "snapped-back" to the primary, or discarded as desired. Although this technique preserves the integrity of primary data while allowing a user to "test" the impact of an operation, it requires the creation of a separate snapshot for each provisional operation to be carried out and the time and storage resources associated with the snapshot may be forfeited if a snapback operation is not ultimately performed. Consequently, and due to other negative associated attributes, the described process has proven to be undesirable.

SUMMARY OF THE INVENTION

Disclosed is a method and system of providing access to a virtual storage device. Embodiments of the present invention may be used to allow limited modifications of a read-only volume using alternate backing store in a persistent manner.

According to one embodiment, access is provided to a virtual storage device comprising a file system storage object to store data to be written to the virtual storage device and a storage device. According to another embodiment, the virtual storage device further comprises a file system storage object to represent the virtual storage device.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" means that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
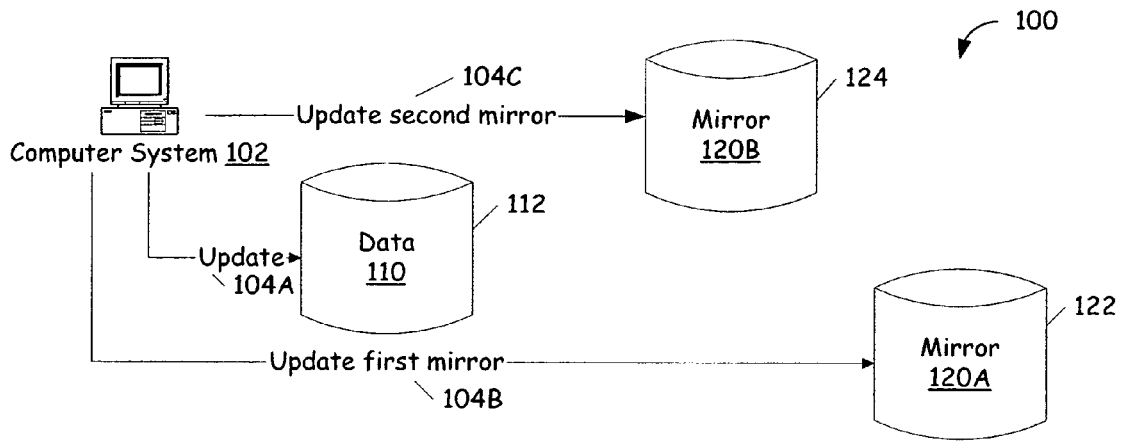
FIGS. 1A and 1B illustrate the generation of a snapshot within a data storage system according to the prior art.
Figure 1B:
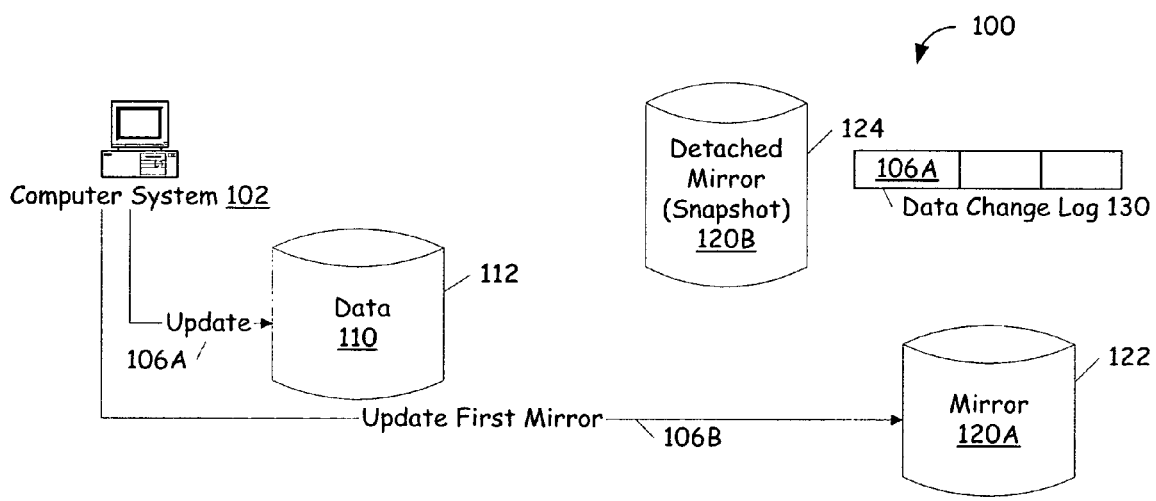
Figure 2:
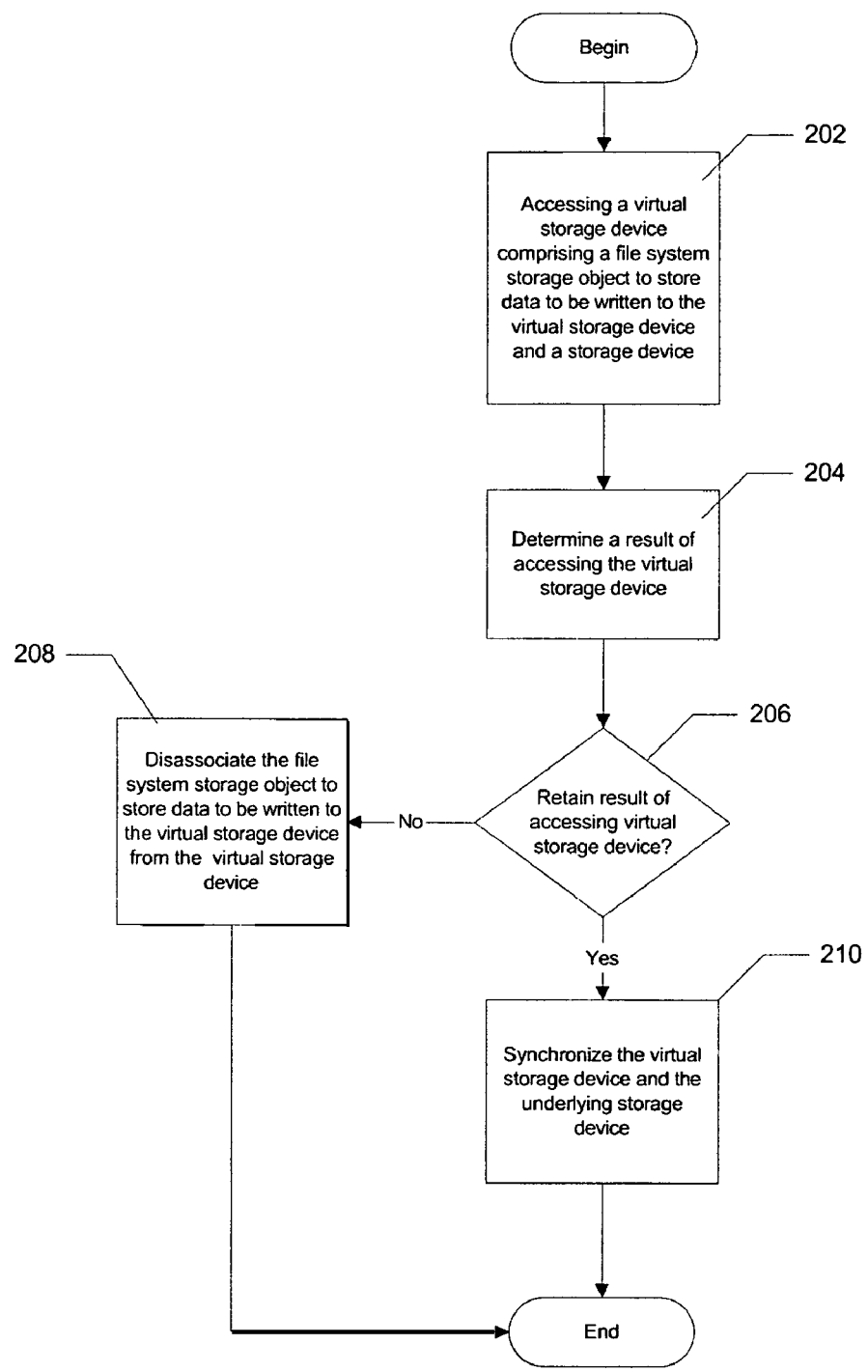
FIG. 2 illustrates a provisional write operation process according to one embodiment of the present invention.

FIG. 2 illustrates a provisional write operation process according to one embodiment of the present invention. In the illustrated process embodiment, a virtual storage device comprising a conventional storage device and a file system storage object to store data to be written to the virtual storage device is first accessed (process block 202). Within the context of the described embodiments of the present invention a file system storage object may include a file (e.g., a data file or "special file"), a link (e.g., a hard link or symbolic link), or directory.

In one particular embodiment of the present invention the described file system storage object comprises a sparse file and the conventional storage device comprises a physical disk or volume. A sparse file is a file that does not have blocks allocated within persistent storage or "backing store" for its entire length/size. The traditional working of a sparse file is that any write to an unallocated region will cause the allocation of new blocks within storage to be made, reads from an unallocated region return zeroes, and writes and reads to allocated regions are serviced as would be for a conventional file. According to another embodiment of the present invention, the file system storage object/sparse file may be physically stored anywhere within the storage environment in which the object is utilized other than within the associated conventional storage device.

Thereafter, a result of the virtual storage device access is determined (process block 204) and decision or selection is made whether or not the determined result will be retained (process block 206). Such a selection may be made explicitly by a user or may be made automatically in response to the occurrence of one or more events (e.g., the occurrence of a general protection fault, the failure of a virtual storage device write operation due to the exhaustion of storage space for an associated sparse file, the modification of the underlying conventional storage device by external means, or the like). If the result is not to be retained the file system storage object (sparse file) to store data to be written to the virtual storage device may be disassociated from the virtual storage device (process block 208). In one embodiment, such a disassociation entails severing or removing a link or reference between the file system storage object and the virtual storage device but may additionally or alternatively include the deletion/destruction of the file system storage object. If a decision is made to retain the result of the virtual storage device access then the virtual storage device may be synchronized with its underlying storage device by copying or moving data which has been modified in the virtual storage device to the storage device (process block 210).

Figure 3:
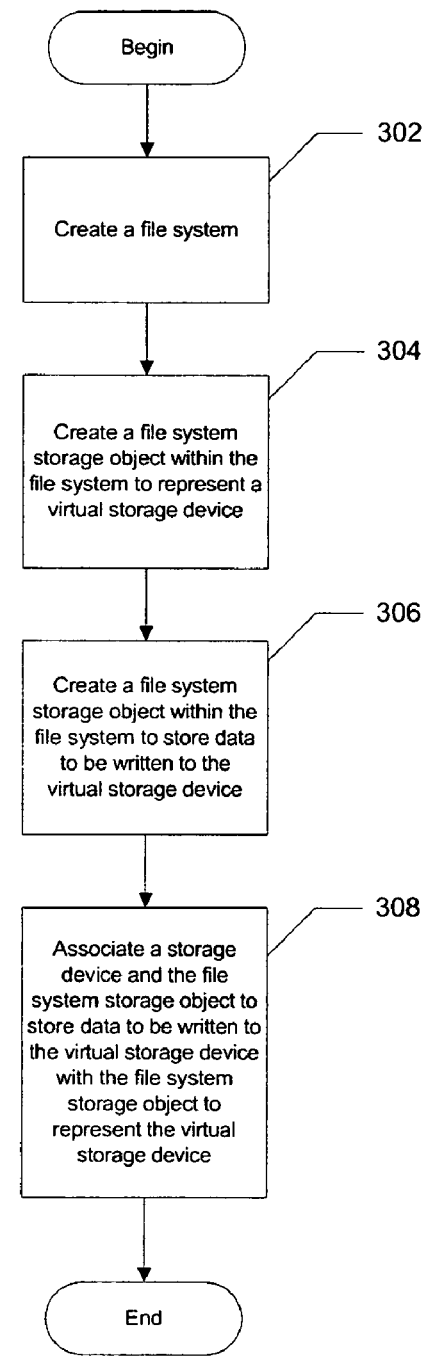
FIG. 3 illustrates a virtual storage device creation process according to one embodiment of the present invention.

FIG. 3 illustrates a virtual storage device creation process according to one embodiment of the present invention. In the illustrated embodiment a file system is first created (process block 302) for use in storing modifications or writes to a plurality of virtual storage devices. According to one embodiment of the present invention, a single such file system may be used for all virtual storage devices and consequently this portion of the illustrated process embodiment may be excluded once the file system has been initially generated. Subsequently, a file system storage object is created within the previously generated file system to represent a virtual storage device (process block 304). According to one embodiment, the described file system storage object comprises a "special file" or "device file" as defined by the UNIX file system and its variants (e.g., Solaris, HP-UX, Linux, AIX, etc.). Another file system storage object is then created (process block 306) to store data to be written to the virtual storage device represented by the previously-generated "special file". The creation of a virtual storage device is then completed by associating the storage object to store writes and a storage device with the storage object to represent the virtual storage device (process block 308). According to one embodiment of the present invention this association is performed using namespace extensions such as "::vxfs::XXX" added to a conventional file (e.g., a suffix or prefix) and a specialized device driver further described herein. In the described embodiment, the XXX portion of the namespace extension is used to identify a specific file system driver extension used to implement special functionality requested for a file.

Figure 4:
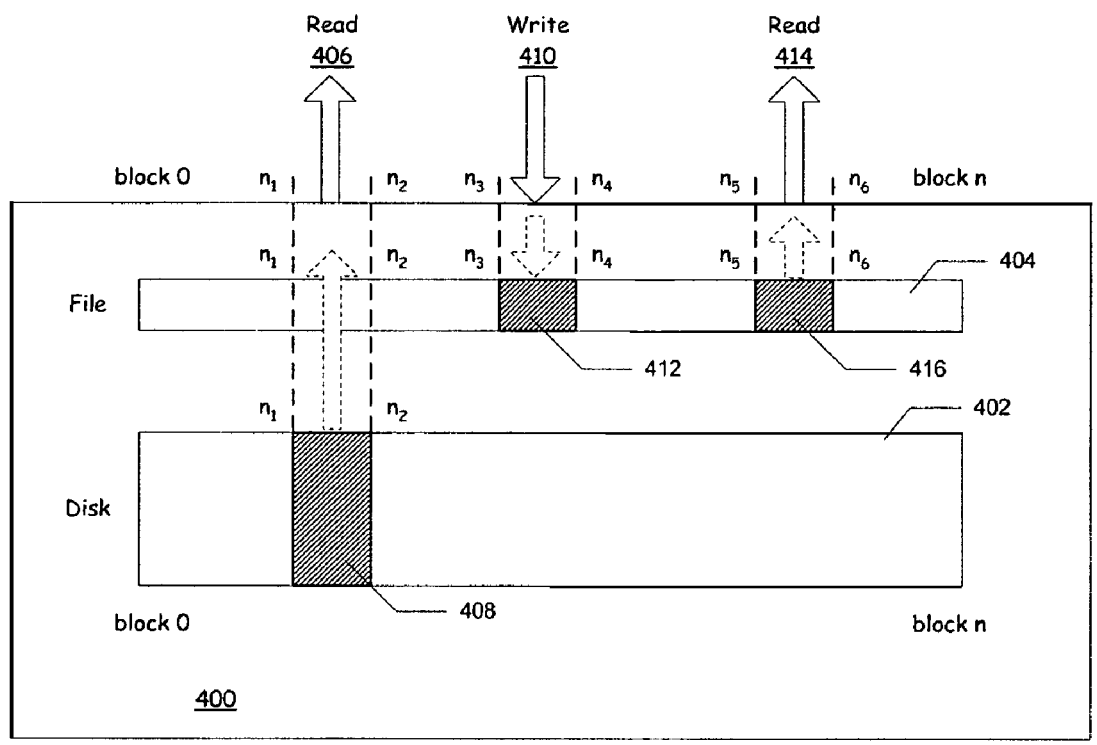
FIG. 4 illustrates a virtual storage device according to one embodiment of the present invention.

FIG. 4 illustrates a virtual storage device according to one embodiment of the present invention. The virtual storage device 400 of the illustrated embodiment comprises n+1 data storage blocks labeled 0 to n as well as an underlying storage device, (disk 402) and associated file system storage object (file 404), each also including or represented by n+1 blocks. While only a single file system storage object (file 404) has been depicted as associated with the underlying storage device (disk 402) of the illustrated embodiment, alternative embodiments of the invention are contemplated in which multiple virtual storage devices are provided, each comprising a distinct file system storage object to store data to be written to that virtual storage device instance which are all simultaneously associated with underlying storage device (disk 402). According to one embodiment of the present invention, file system storage object (file 404) comprises a sparse file as previously described herein. According to another embodiment, the underlying storage device (disk 402) comprises a snapshot of another storage device as previously described herein.

FIG. 4 further illustrates the access properties or characteristics of the virtual storage device 400. Virtual storage device 400 may be generated as described with respect to an embodiment of the present invention and then presented to one or more applications as a conventional storage device for access. Such access, as well as the generation of virtual storage devices, is managed using a specialized device driver described further herein according to one or more embodiments of the present invention. Each write operation (e.g., write operation 410) to be performed to virtual storage device 400 is performed on a region (e.g., region 412 between blocks $n_3$ and $n_4$ of file 404) within the associated file system storage object rather than the underlying storage device (disk 402) as shown. Accordingly data stored within the underlying storage device (disk 402) may be maintained as immutable or "read-only" while write operations (e.g., provisional write operations) are allowed to proceed using the file system storage object. If the referenced region of the requested write operation was previously allocated or written to within the file system storage object (file 404)$_2$ the pre-existing data, if any, is simply overwritten. Otherwise, if the referenced region of the requested write operation is a "hole" (i.e., was not previously allocated or written to), a region within the file system storage object is allocated and the write operation is performed thereafter within the newly-allocated space.

Read operations such as read operations 406 and 414 may be satisfied either from the underlying storage device or the file system storage object. According to the illustrated embodiment of FIG. 4, a read operation (e.g., read operation 406) to a region (e.g., region 408 between blocks $n_1$ and $n_2$ of virtual storage device 400) which has not been allocated within the associated file system storage object since the creation of the virtual storage device 400 is satisfied from or performed on the underlying storage device 402. By contrast, a read operation (e.g., read operation 414) to a region (e.g., region 416 between blocks $n_5$ and $n_6$ of virtual storage device 400) which has been allocated or previously written to within the associated file system storage object since the creation of the virtual storage device 400 is satisfied from or performed on the file system storage object 404 associated with the virtual storage device 400 as shown. It is to be noted that this differs from conventional systems in which a read from an unallocated portion or "hole" of a sparse file returns zeroes.

Figure 5:
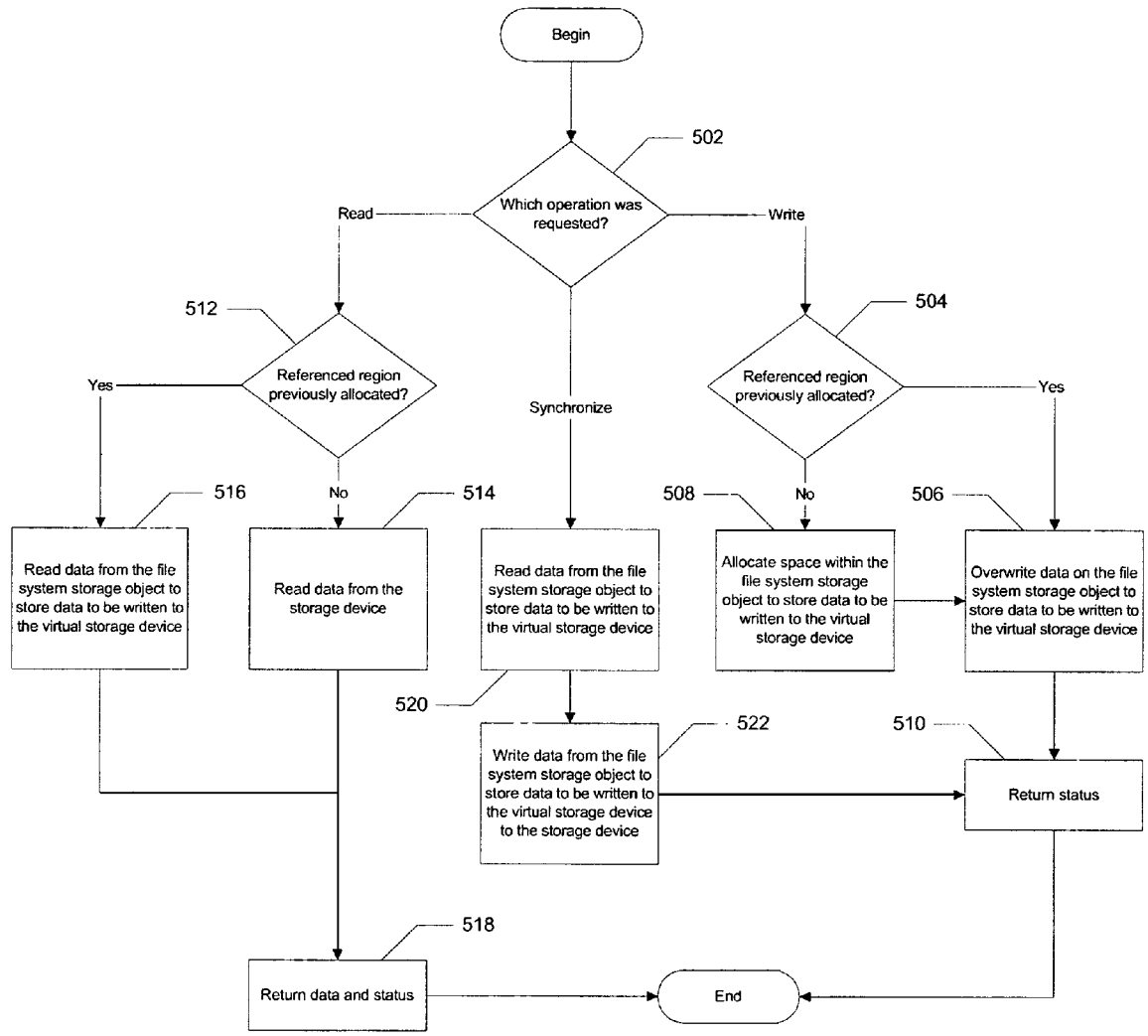
FIG. 5 illustrates a virtual storage device access process for accessing a virtual storage device such as that depicted in FIG. 4 according to one embodiment of the present invention.

FIG. 5 illustrates a virtual storage device access process for accessing a virtual storage device such as that depicted in FIG. 4 according to one embodiment of the present invention. In the illustrated process, a determination is first made as to which of a plurality of operations has been requested (process block 502). If the requested operation is identified as a write operation, a determination is thereafter made whether blocks or extents have been previously allocated for a region associated with or referenced by the write operation request (process block 504) within an associated file system storage object. A region, within the description herein of embodiments of the present invention comprises a contiguous set of logical (or physical blocks) on a file (or device). Regions may be represented or described herein using a notation in which a bracket designates inclusion and a parentheses designates exclusion. Accordingly, the notation "[x,y)" could be used to describe a region starting at a block x and ending immediately before a block y.

A write operation to a region for which blocks or extents have been previously allocated within the file system storage object results simply in the overwriting of previously written data with data from the requested write operation (process block 506). If a determination is made that the requested write operation corresponds to a region for which blocks or extents have not been previously allocated (e.g., when no prior write to the region has occurred), space is allocated within the file system storage object to store data for the corresponding region within the virtual storage device (process block 508) and thereafter the write operation is performed on the newly-allocated space. After the data has been written to the file system storage object (process block 506) in either event, the status indicative of whether the write was successful or whether an I/O error occurred is returned (process block 510) to the initiator of the write.

If the requested operation is identified as a read operation (process block 502), a determination is thereafter made whether blocks or extents have been previously allocated within an associated file system storage object for a region associated with or referenced by the read operation request (process block 512). If a determination is made that the requested write operation corresponds to a region for which blocks or extents have not been previously allocated, the requested data is read from the underlying storage device of the virtual storage device (process block 514). Else, if the requested read operation corresponds to a region for which blocks or extents have been previously allocated, data is read from the file system storage object to store data to be written to the virtual storage device (process block 516). After the data has been read (either from the file system storage object to store data to be written to the virtual storage device or directly from an associated storage device) the data is returned to its requestor (process block 518). Alternatively, if the requested operation is identified as a synchronization operation (e.g., following a provisional or ordinary write operation to the virtual storage device and a determination that the result of that write operation is acceptable/desirable/correct etc.), data is read from the file system storage object to store data to be written to the virtual storage device (process block 520) and subsequently written to the virtual storage device's underlying storage device (process block 522) before returning status (process block 510) indicative of whether the write was successful or whether an I/O error occurred.

Figure 6:
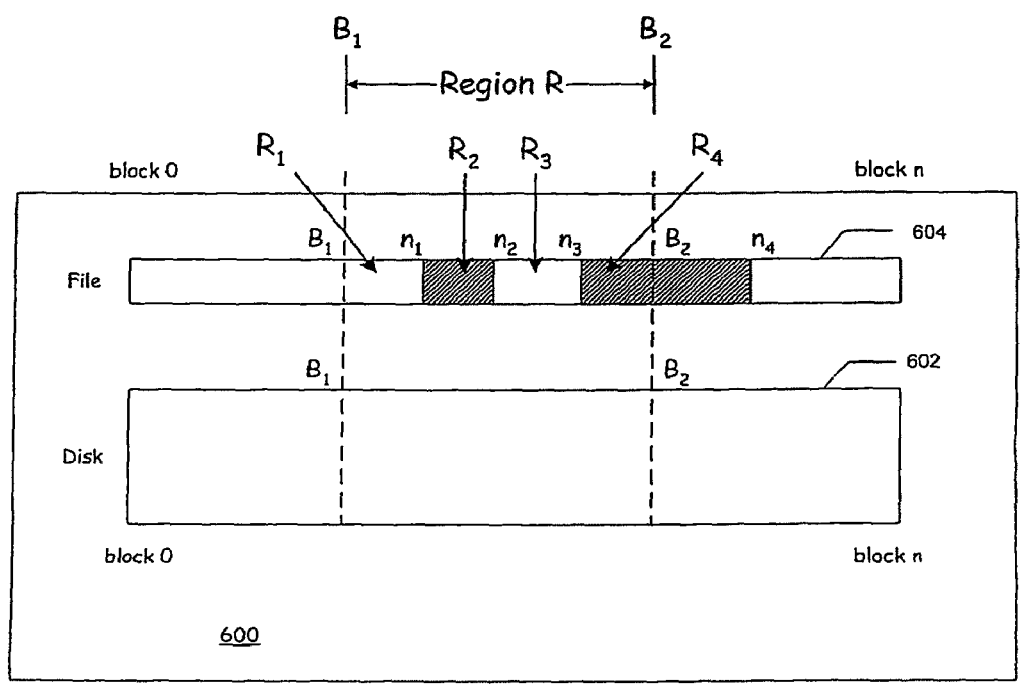
FIG. 6 illustrates a virtual storage device including a region which may be split into a number of sub-regions according to one embodiment of the present invention.

FIG. 6 illustrates a virtual storage device including a region which may be split into a number of sub-regions according to one embodiment of the present invention. Virtual storage device 600 of the illustrated embodiment comprises n+1 data storage blocks labeled 0 to n as well as an underlying storage device (disk 602), and associated file system storage object (file 604), each also including or represented by n+1 blocks similar to as described previously with respect to virtual storage device 400 of FIG. 4. FIG. 6 includes however a region [b1, b2) labeled region R in the depicted environment. This region "R" corresponds to similarly labeled regions on the file system storage object or "sparse file" to store data to be written to the virtual storage device and real device that constitute the pseudo device that behaves as a writable snapshot. As is illustrated by FIG. 6, the region R can be split into the regions $R_1$-$R_4$ where each region $R_i$ is either completely allocated or completely unallocated on the sparse file. In FIG.

6, regions $[B_1, n_1)$ or "$R_1$" and $[n_2, n_3)$ or "$R_3$" are unallocated while regions $[n_1, n_2)$ or "$R_2$" and $[n_3, B_2)$ or "$R_4$" are allocated. Accordingly, any operation on a generic region R can be treated as an independent operation on each of the constituent regions $R_1$, each of which is either completely allocated or completely unallocated in the file system storage object to store data to be written to the virtual storage device.

Figure 7:
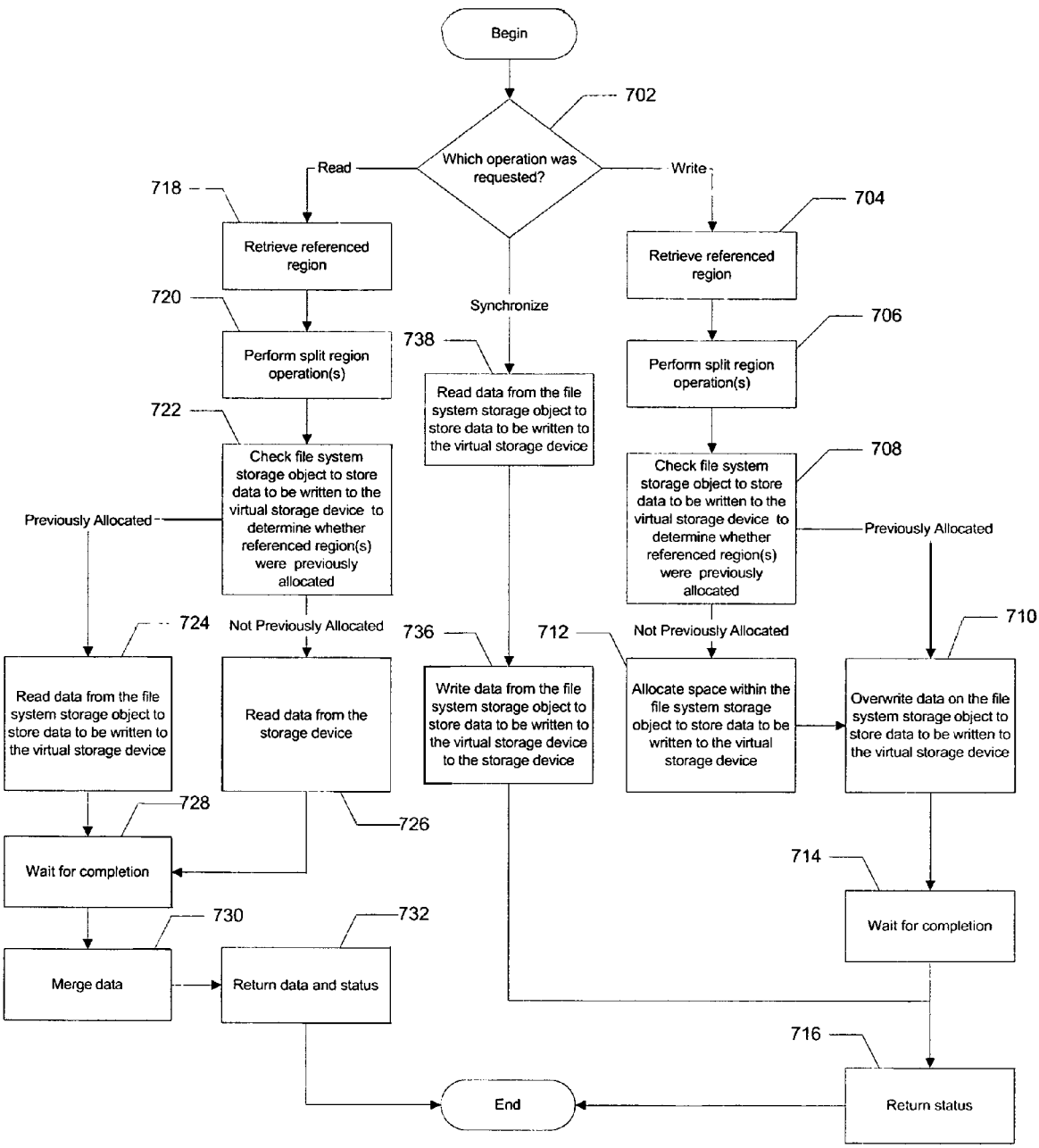
FIG. 7 illustrates a virtual storage device access process for accessing a virtual storage device as depicted in FIG. 6 according to one embodiment of the present invention.

FIG. 7 illustrates a virtual storage device access process for accessing a virtual storage device as depicted in FIG. 6 according to one embodiment of the present invention. In the illustrated process, a determination is first made as to which of a plurality of operations has been requested (process block 702). If the requested operation is identified as: a write operation, a region referenced by the write operation is retrieved (process block 704) and then split into its allocated and unallocated component sub-regions by the performance of a split region operation (process block 706). Thereafter an associated file system storage object to store data to be written to the virtual storage device is checked to determine whether any referenced region(s) or sub-regions thereof were previously allocated (process block 708). For any (sub)regions determined to have been previously allocated, data from the requested write operation is overwritten on the file system storage object to store data to be written to the virtual storage device (process block 710). For (sub)regions determined to not have been previously allocated, space is allocated within the file system storage object (process block 712) prior to (over)writing the write operation data as shown. The illustrated process then waits for the completion of the write operation to the file system storage object (process block 714) before returning status indicative of whether the write was successful or whether an I/O error occurred (process block 716) to the initiator of the write.

If the requested operation is identified as a read operation, a region referenced by the read operation is retrieved (process block 718) and then split into its allocated and unallocated component sub-regions by the performance of a split region operation (process block 720). Thereafter an associated file system storage object to store data to be written to the virtual storage device is checked to determine whether any referenced region(s) or sub-regions thereof were previously allocated (process block 722). Data is then read from the file system storage object for any (sub)regions determined to have been previously allocated (process block 724) and/or from an underlying storage device for (sub)regions determined to not have been previously allocated (process block 726). The illustrated process then waits for the completion of the read operation (process block 728) before merging together data read from the underlying storage device and file system storage object (process block 730) if necessary to form a single continuous block or region of data. The generated data is then returned along with status information concerning the read operation (process block 732) to the initiator of the read.

Alternatively, if the requested operation is identified as a synchronization operation (e.g., following a provisional or ordinary write operation to the virtual storage device and a determination that the result of that write operation is acceptable/desirable/correct etc.), data is read from the file system storage object to store data to be written to the virtual storage device (process block 738) and subsequently written to the virtual storage device's underlying storage device (process block 736).

Figure 8A:
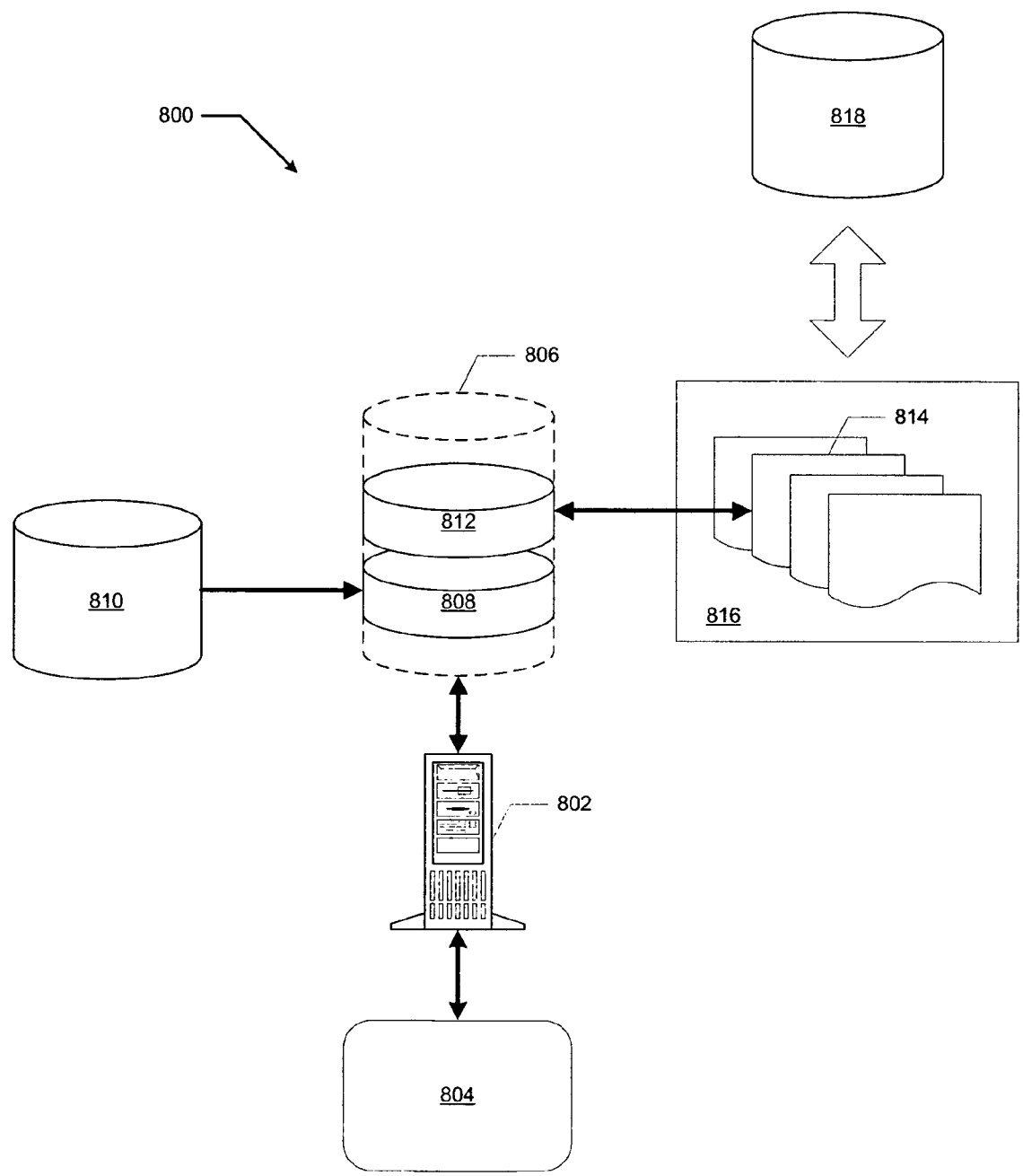
FIG. 8A illustrates a storage environment according to one embodiment of the present invention.

FIG. 8A illustrates a storage environment according to one embodiment of the present invention. The depicted storage environment 800 includes a server data processing system 802 including a device driver 804 and is coupled with and provides access to, a virtual storage device 806. According the embodiment of FIG. 8A, virtual storage device 806 includes a first component 808 corresponding to an underlying storage device 810 and a second component 812 corresponding to a file system storage object to store data to be written to the virtual storage device in the form of a sparse file 814 within file system 816. In the illustrated embodiment, file system 816 is in turn stored within a backing store 818 distinct from storage device 810.

Figure 8B:
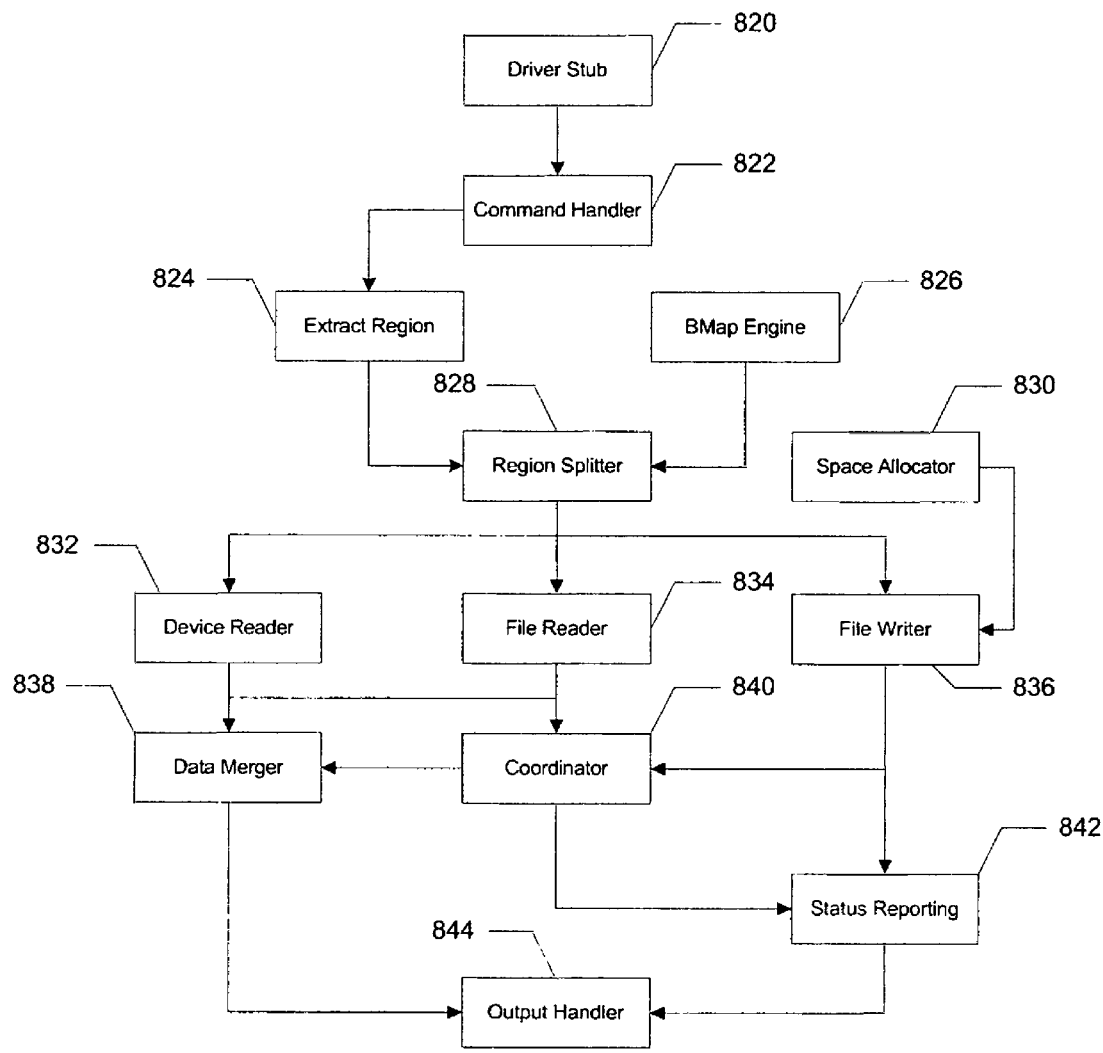
FIG. 8B illustrates a block diagram of a device driver as depicted in FIG. 8A.

FIG. 8B illustrates a block diagram of a device driver as depicted in FIG. 8A. The device driver of the illustrated embodiment includes a driver stub element 820 accessible via an external interface (not illustrated), a command handler element 822, an extract region element 824, a byte map (bmap) engine element 826, a region splitter element 828, a space allocator element 830, a device reader element 832, a file reader 834, a file writer element 836, a data merger element 838, a coordinator element 840, a status reporting element 842, and an output handler element 844 coupled together as shown. It should be understood that while a fixed number of elements of a device driver for use with embodiments of the present invention has been shown in FIG. 8B, a greater or lesser number of elements, modules, or other components are utilized in alternative embodiments of the present invention.

Driver stub element 820 of the illustrated embodiment handles functionality required to conform to a driver specification in a given Unix kernel. Command handler element 822 is utilized in the illustrated embodiment to distinguish between read and write operation requests. The extract region element 824 determines the affected region on the virtual storage device given an operation. BMap engine element 826 translates from logical regions on a sparse file and provides a mapping onto corresponding regions of the sparse file or storage device. Region splitter element 828 splits a virtual storage device region referenced within a memory access operation request into contiguous sub-parts or sub-regions such that each sub part is either completely allocated within an associated sparse file or is completely unallocated.

Space allocator 830 in the described embodiment allocates backing store to the sparse file for a given region. Device reader 832 of the embodiment of FIG. 8B is utilized to read in data given a region from an underlying device. In one embodiment file reader element 834 reads in data given a region from the sparse file. File writer element 836 by contrast is responsible for writing out data given a region of the sparse file where allocation for the write is assumed to exist. Data merger element 838 given that all the operations on constituent sub-regions have been completed (as determined by coordinator element 840) the data merger element 838 assembles sub-regions into regions using ordering and concatenation. When an operation on a given region is split into operations on a set of sub-regions coordinator element 840 waits for the operations on all the sub-regions to complete before allowing one or more processes of the present invention to continue. Unlike when using a "real" storage device, writes to a virtual storage device can fail for lack of space. Accordingly, status reporting element 842 collects information regarding I/O errors for transmission to a user. Lastly, output handler element 844 returns data (for reads) and status info (for writes) to a user.

In alternative embodiments of the present invention, a device driver may further include a number of elements used in performing a synchronization operation between a virtual storage device an its underlying storage device. The device driver of such a described embodiment may include, for example, a device synching element (not illustrated) which interacts with command handler element 822, file reader element 834, status reporting element 842, extract region element 824 and a device writer component (not illustrated). The described device driver may further include a device writer component (not illustrated) to write changes to the underlying storage device and interact with the device synching element and status reporting element 842. Lastly, the alternative embodiments described herein may further include an extract changed region element (not illustrated) which returns regions of a file that have been modified and interacts with the device synch component.

Figure 9:
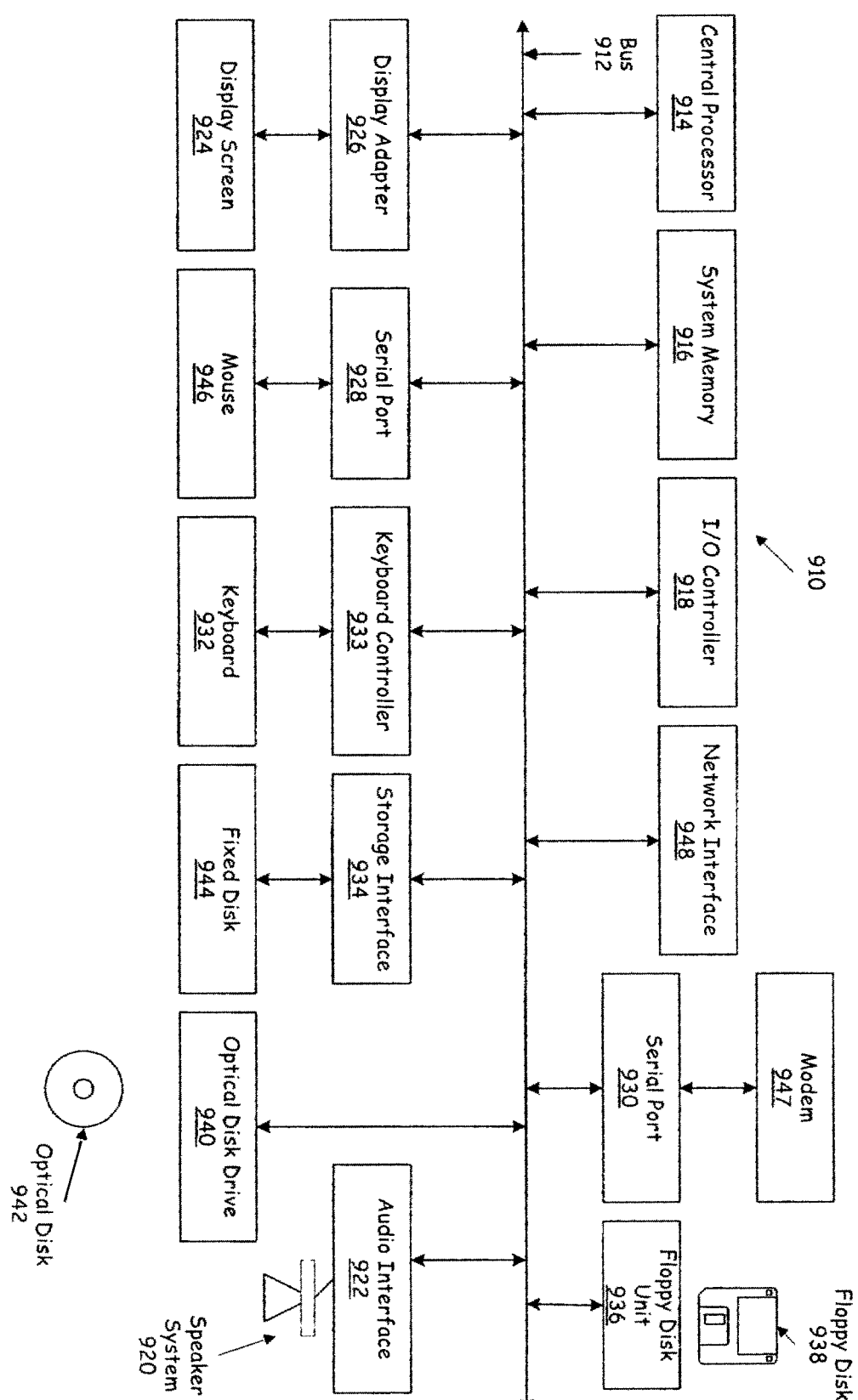
FIG. 9 illustrates a block diagram of a data processing system suitable for implementing embodiments of the present invention.

FIG. 9 illustrates a block diagram of a data processing system suitable for implementing embodiments of the present invention. Computer system 910 includes a bus 912 which interconnects major subsystems of computer system 910 such as a central processor 914, a system memory 916 (typically RAM, but which may also include ROM, flash RAM, or the like), an input/output controller 918, an external audio device such as a speaker system 920 via an audio output interface 922, an external device such as a display screen 924 via display adapter 926, serial ports 928 and 930, a keyboard 932 (interfaced with a keyboard controller 933), a storage interface 934, a floppy disk drive 936 operative to receive a floppy disk 938, and a CD-ROM drive 940 operative to receive a CD-ROM 942. Also included are a mouse 946 (or other point-and-click device, coupled to bus 912 via serial port 928), a modem 947 (coupled to bus 912 via serial port 930) and a network interface 948 (coupled directly to bus 912).

Bus 912 allows data communication between central processor 914 and system memory 916, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., CD-ROM drive 940), floppy disk unit 936 or other storage medium. Additionally, applications may be in the form of electronic signals modulated in accordance with the application and data communication technology when accessed via network modem 947 or interface 948.

Storage interface 934, as with the other storage interfaces of computer system 910, may connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an Internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 9 to be present to practice the present invention. The devices and subsystems may be interconnected in different ways from that shown in FIG. 9. The operation of a computer system such as that shown in FIG. 9 is readily known in the art and is not discussed in detail in this application. Code to implement the present invention may be stored in computer-readable storage media such as one or more of system memory 916, fixed disk 944, CD-ROM 942, or floppy disk 938. Additionally, computer system 910 may be any kind of computing device, and so includes personal data assistants (PDAs), network appliance, X-window terminal or other such computing device. The operating system provided on computer system 910 may be MS-DOS®, MS-WINDOWS®, OS/2®, UNIX®, Linux® or other known operating system. Computer system 910 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 910). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A computer implemented method comprising:
   providing access to a virtual storage device, wherein
      said virtual storage device comprises a first file system storage object and a storage device, wherein
      said first file system storage object is configured to store data in block regions corresponding to block regions of said storage device; and
      performing all requested write operations to said virtual storage device by performing write operations to some block region within said first file system storage object but not to any block region of said storage device.

2. The method of claim 1, wherein said virtual storage device further comprises a second file system storage object, said second file system storage object being configured to represent said virtual storage device.

3. The method of claim 1, wherein said providing comprises associating said storage device with said virtual storage device, wherein said associating comprises configuring said first file system storage object to store data to be written to said storage device.

4. The method of claim 1, wherein said storage device comprises a read-only storage device.

5. The method of claim 1, wherein said providing comprises:
   reading data from said storage device in response to receipt of a read operation request for said virtual storage device.

6. The method of claim 1, wherein said providing comprises:
   writing data to a region of said first file system storage object in response to receipt of a write operation request for said virtual storage device.

7. The method of claim 6, wherein said providing further comprises:
   reading data from said region of said first file system storage object in response to said writing.

8. The method of claim 6, wherein said providing further comprises: determining a result of said writing; and
   synchronizing said first file system storage object and said storage device in response to said determining.

9. The method of claim 6, wherein said providing further comprises: determining a result of said writing; and
   disassociating said first file system storage object from said virtual storage device in response to said determining.

10. The method of claim 1, wherein said first file system storage object comprises a sparse file.

11. The method of claim 2, wherein said second file system storage object comprises a special file.

12. The method of claim 1, wherein said virtual storage device comprises a writable storage checkpoint and a primary file set.

13. A system comprising:
   a first storage device configured to provide storage to support a virtual storage device,
      wherein
      said virtual storage device comprises a first file system storage object and a second storage device, wherein
      said first file system storage object is stored on said first storage device and is configured to store data in block regions corresponding to block regions of said second storage device; and
   a file system module to provide access to said virtual storage device, wherein
      all requested write operations to said virtual storage device are performed by performing write operations to some block region within said first file system storage object but not to any block region of said second storage device.

14. The system of claim 13, wherein,
   said virtual storage device further comprises a second file system storage object, wherein said second file system storage object is configured to represent said virtual storage device.

15. The system of claim 13, wherein,
said file system module comprises a file system module to associate said first file system storage object and said second storage device with said virtual storage device.

16. A computer system comprising:
means for supporting the storage of a virtual storage device, wherein
said virtual storage device comprises a first file system storage object and a first storage device,
said means for supporting the storage of said virtual storage device comprises a second storage device, and
the first file system storage object is stored on said means for supporting the storage of said virtual storage device and is configured to store data in block regions corresponding to block regions of said first storage device; and
means for providing access to said virtual storage device, wherein all requested write operations to said virtual storage device are performed by performing write operations to some block region within said first file system storage object but not to any block region of said second storage device.

17. The system of claim 16, wherein,
said virtual storage device further comprises a second file system storage object, wherein the second file system storage object is configured to represent said virtual storage device.

18. The system of claim 16 wherein
said means for providing access to said virtual storage device comprises means for associating said first file system storage object and said first storage device with said virtual storage device.

19. A computer program product comprising:
a plurality of instructions executable by a computer, wherein said plurality of instructions, when executed by said computer, cause said computer to:
provide access to a virtual storage device stored on a storage device, wherein
said virtual storage device comprises a first file system storage object and a storage device, wherein
said first file system storage object is configured to store data in block regions corresponding to block regions of said storage device, and
perform all requested write operations to said virtual storage device by performing write operations to some block region within said first file system storage object but not to any block region of said storage device; and
computer readable media, wherein said computer program product is encoded in said computer readable media.

20. The computer program product of claim 19, wherein, said virtual storage device further comprises a second file system storage object configured to represent said virtual storage device.

21. The computer program product of claim 19, wherein, said plurality of instructions executable by said computer further comprise instructions to cause said computer to associate said first file system storage object and said storage device with said virtual storage device.

* * * * *